Patented Apr. 6, 1926.

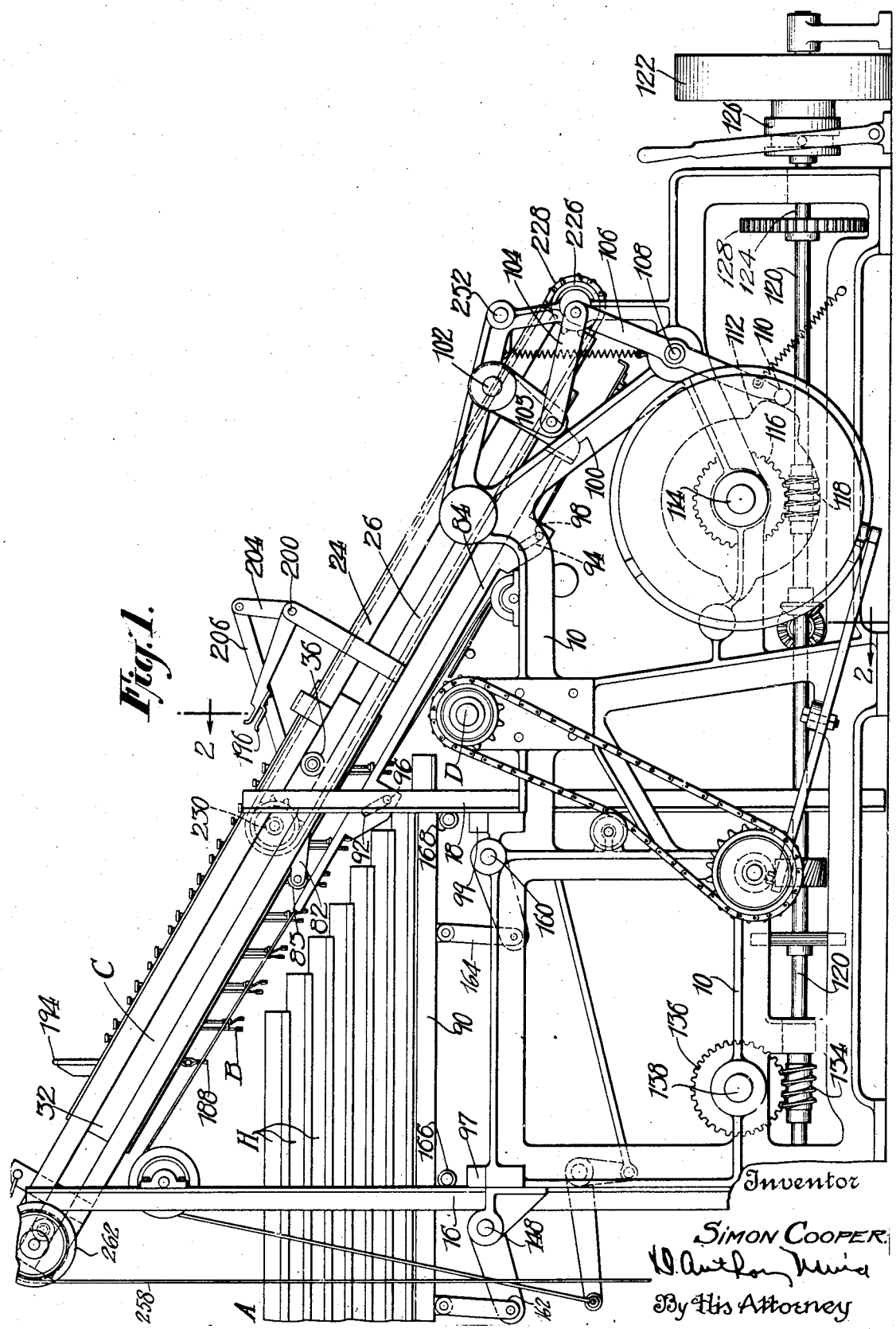

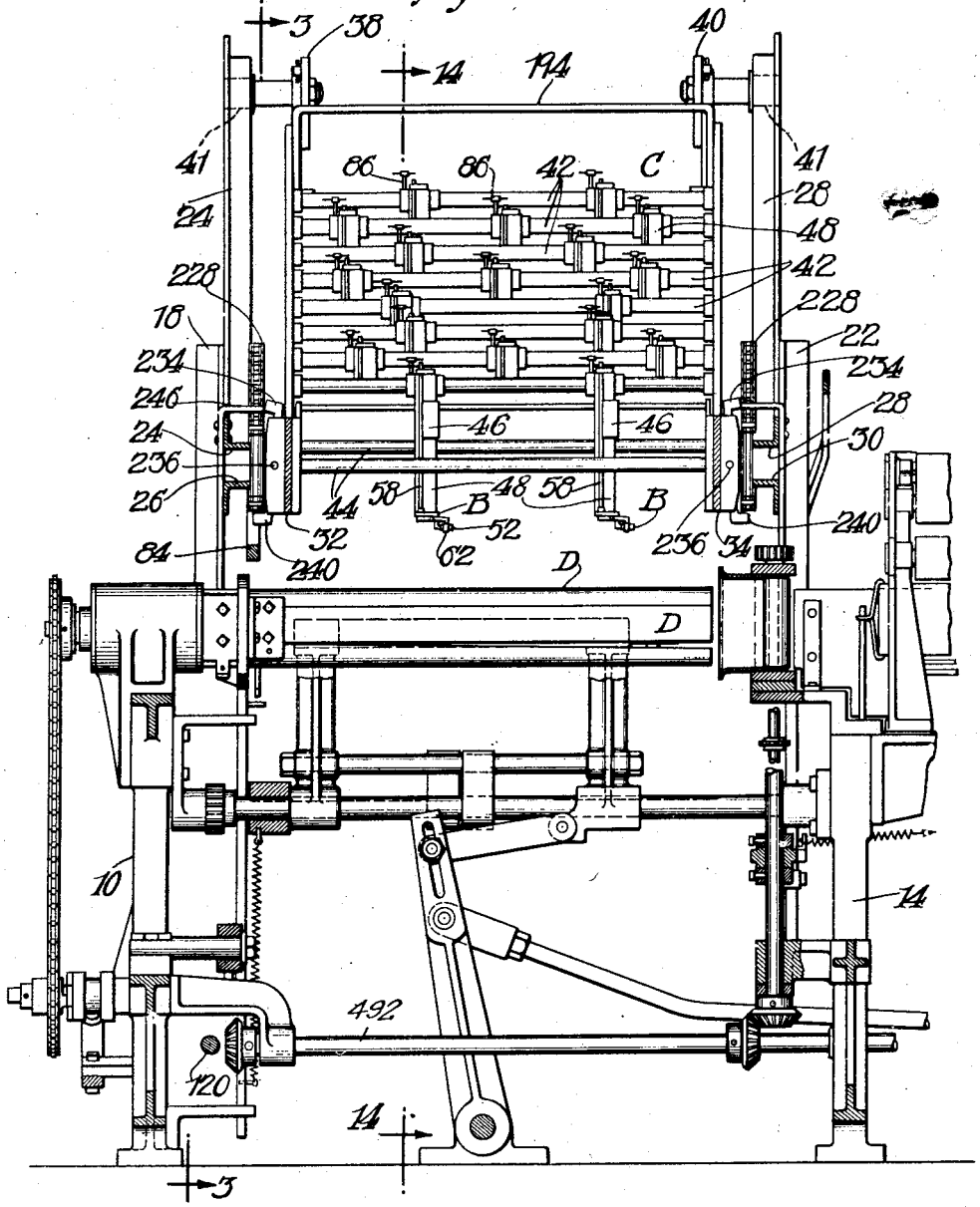

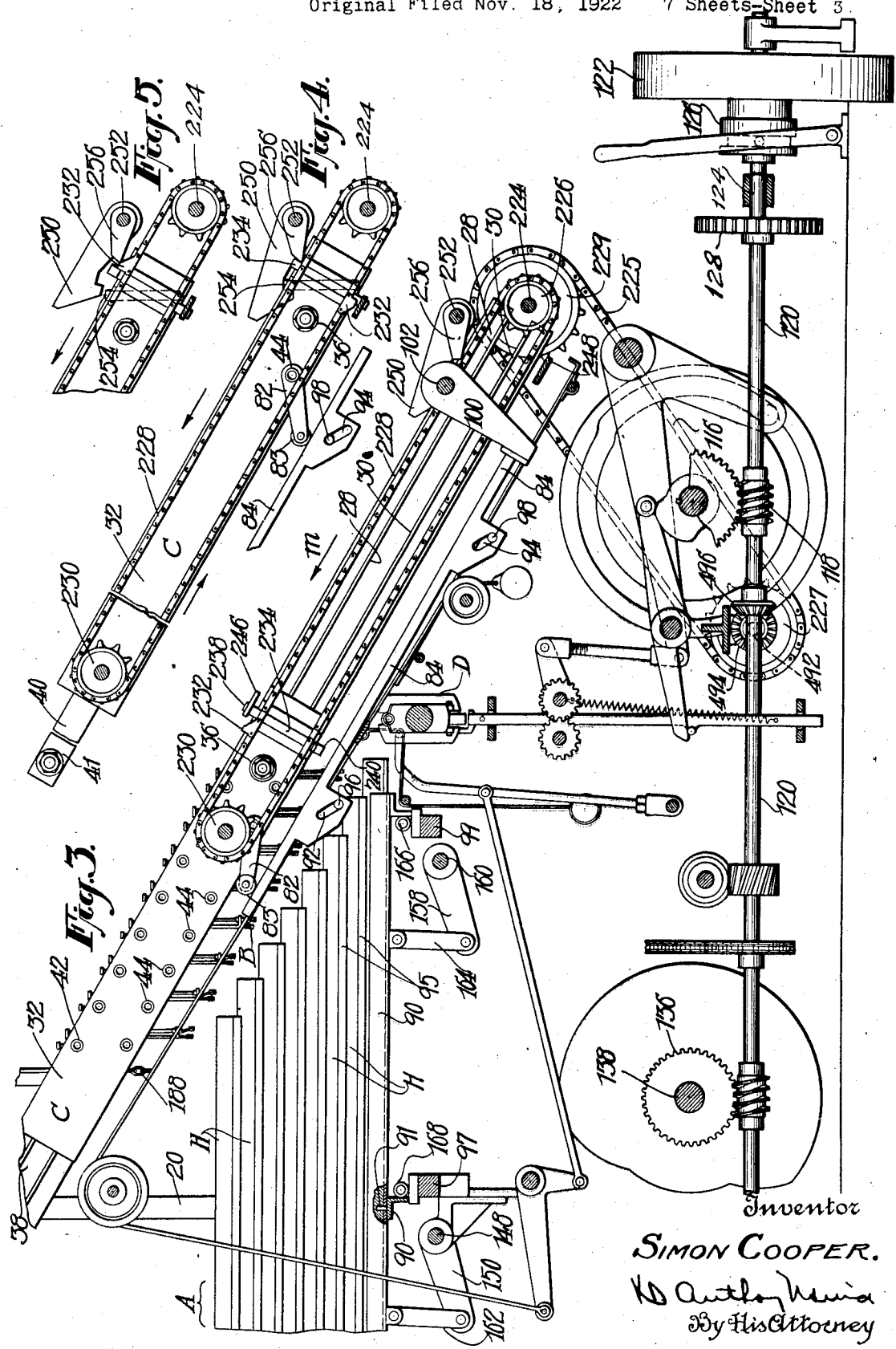

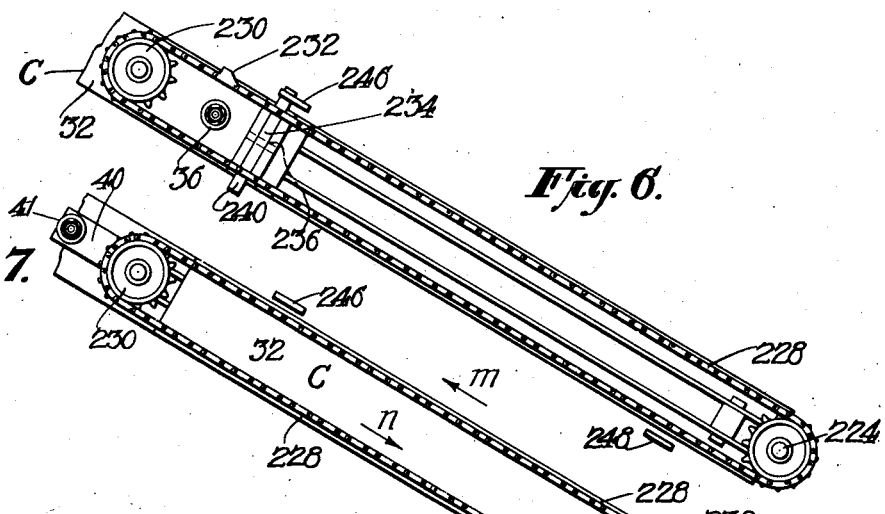
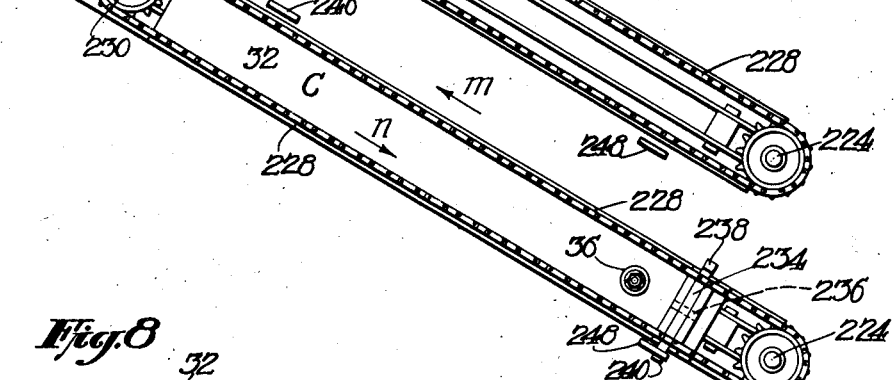
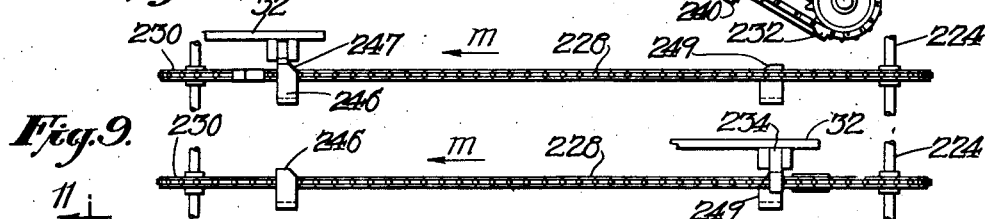
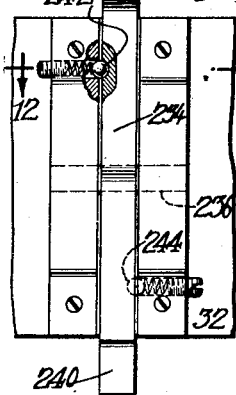
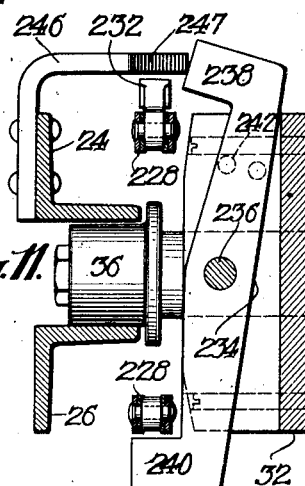
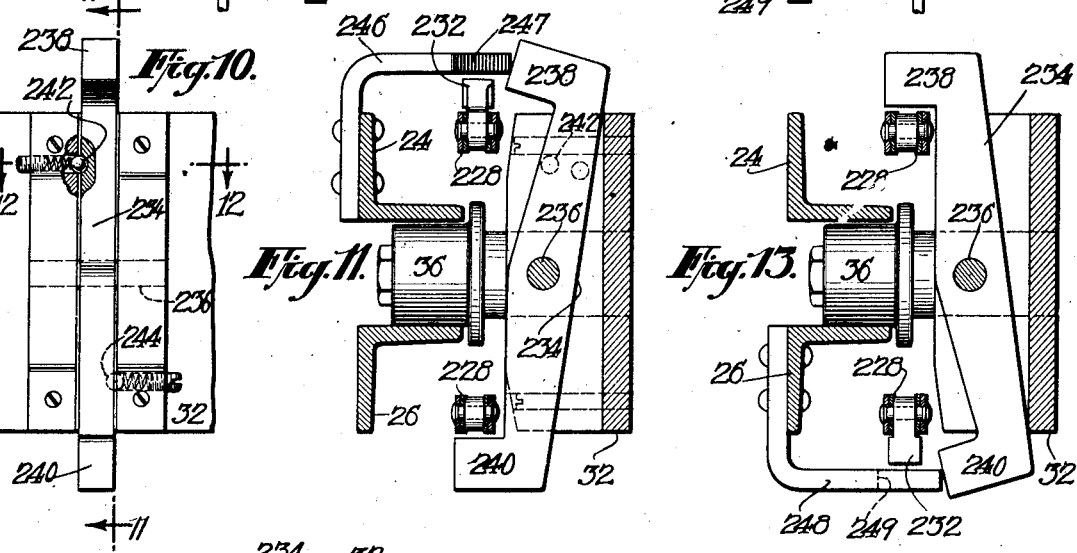
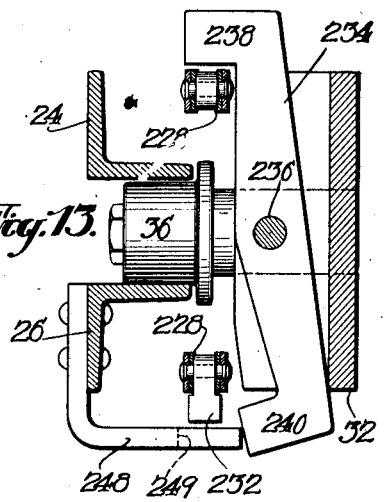
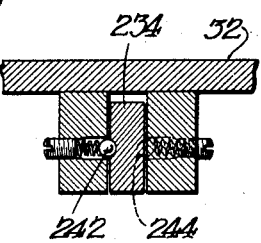
Inventor
SIMON COOPER.
By His Attorney April 6, 1926. 1,579,469
S. COOPER
SHEET SEPARATING AND FEEDING APPARATUS
Original Filed Nov. 18, 1922   7 Sheets-Sheet 5
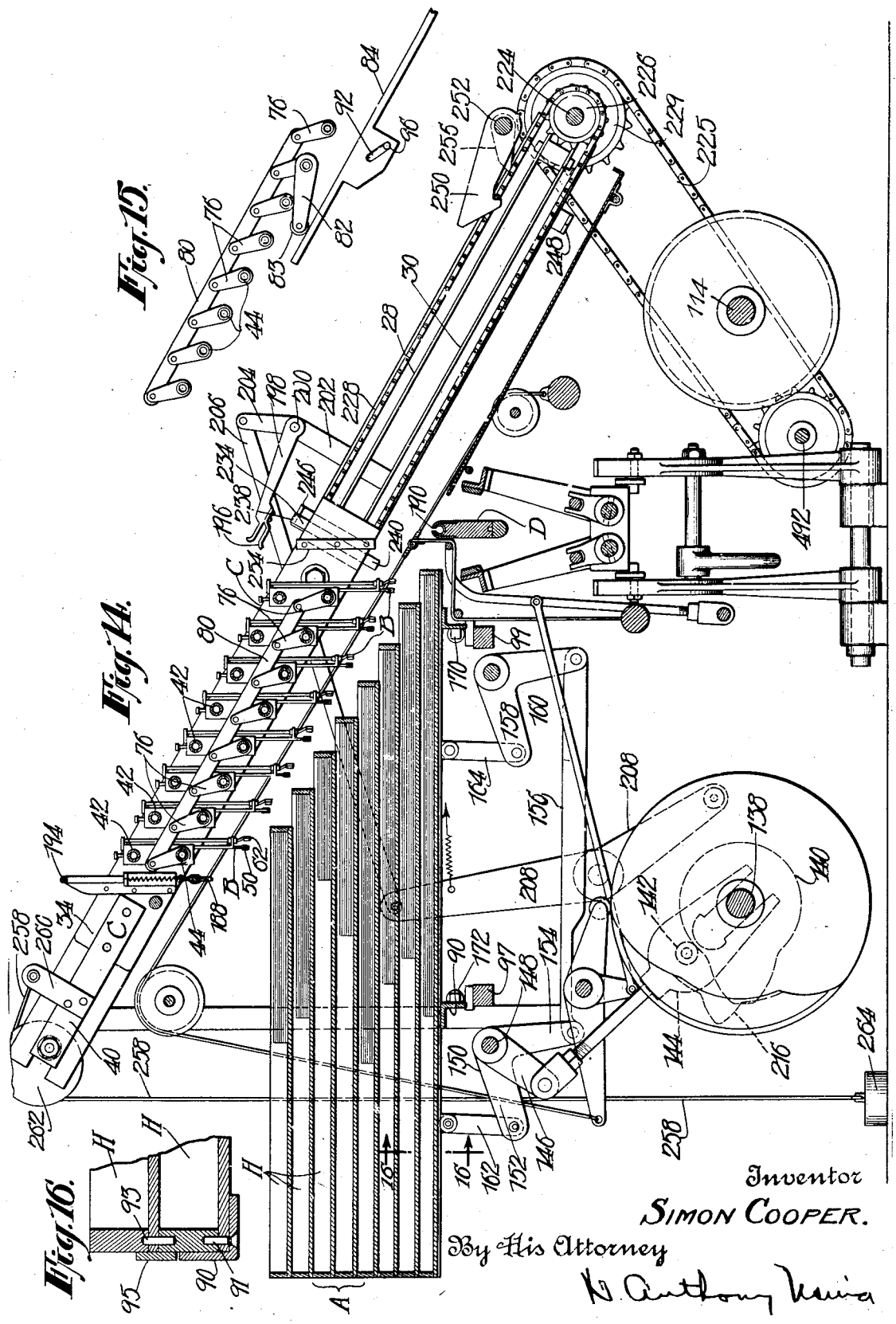
Inventor
SIMON COOPER.
By His Attorney April 6, 1926.  
S. COOPER  
1,579,469  
SHEET SEPARATING AND FEEDING APPARATUS  
Original Filed Nov. 18, 1922    7 Sheets-Sheet 6
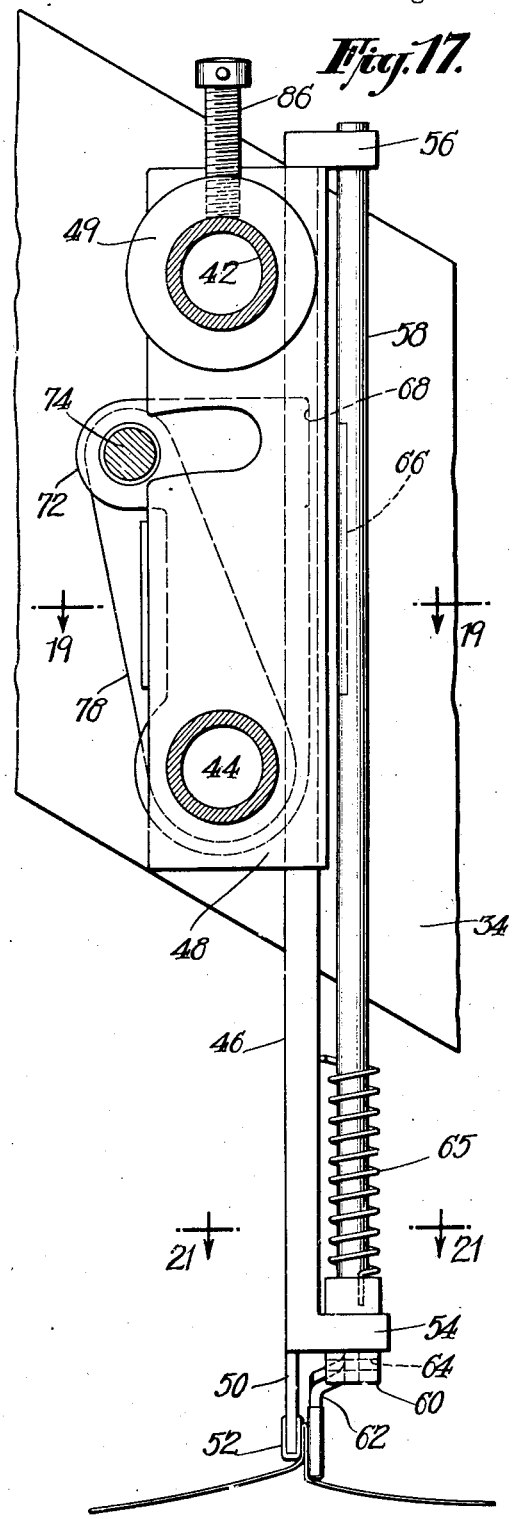
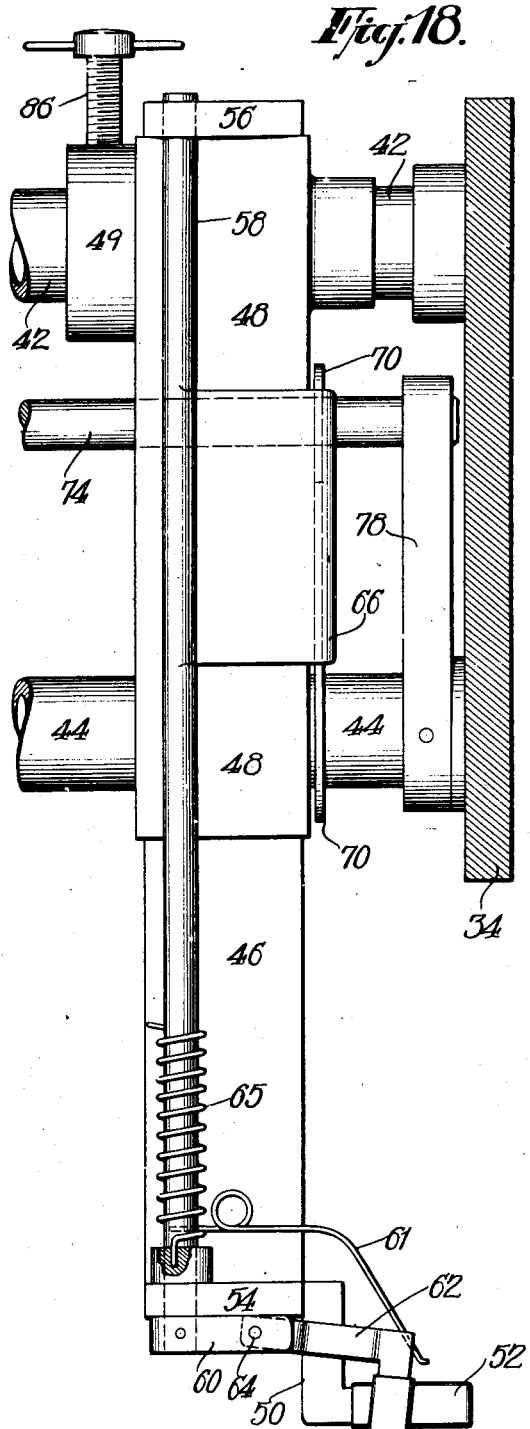
Inventor  
SIMON COOPER.  
By His Attorney

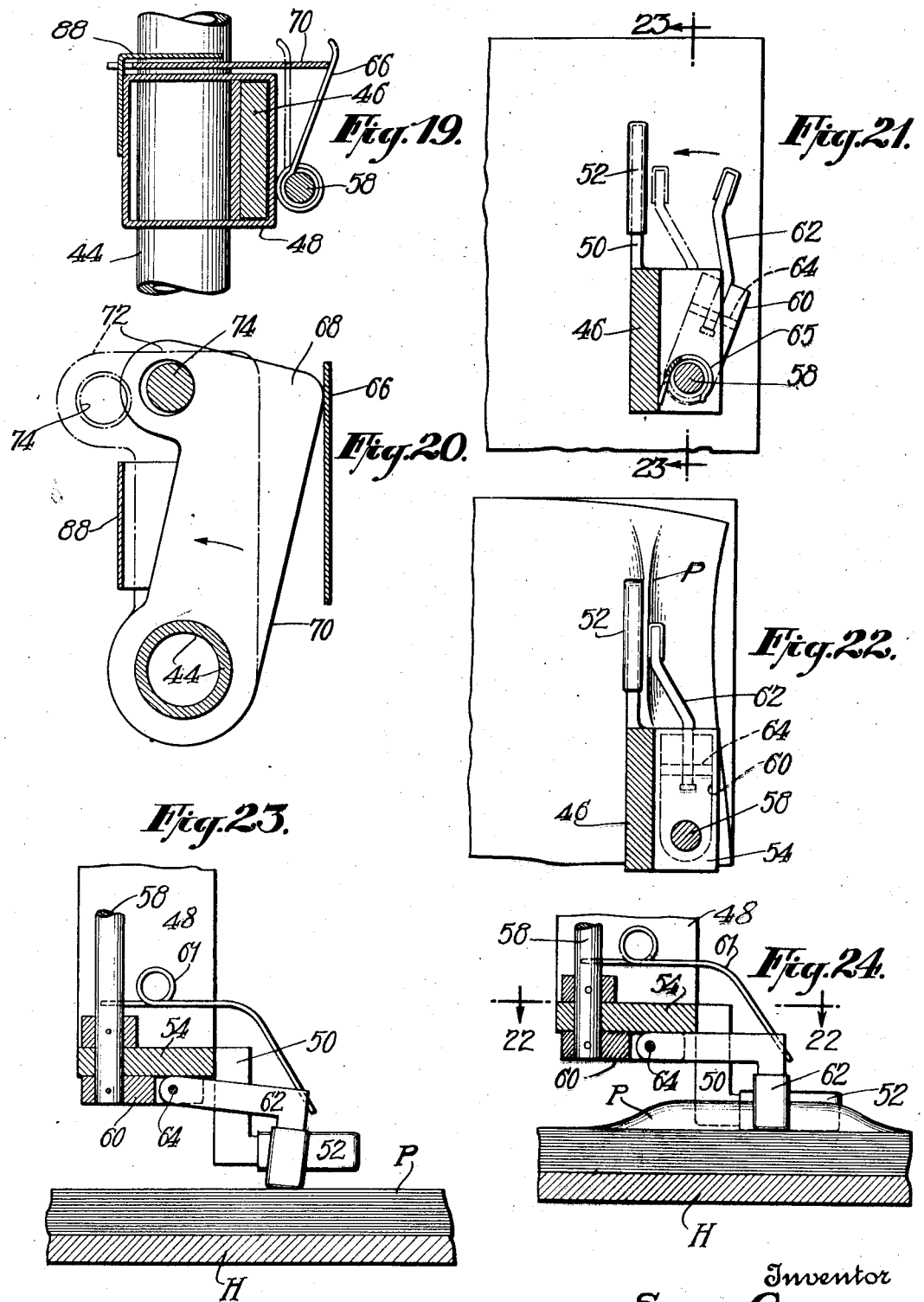

1,579,469

UNITED STATES PATENT OFFICE.

SIMON COOPER, OF BROOKLYN, NEW YORK, ASSIGNOR TO THE McCALL COMPANY, OF NEW YORK, N. Y., A CORPORATION OF NEW YORK.

SHEET SEPARATING AND FEEDING APPARATUS.

Original application filed November 18, 1922, Serial No. 601,858. Divided and this application filed August 27, 1924. Serial No. 734,387.

*To all whom it may concern:*

Be it known that I, SIMON COOPER, a citizen of the United States, and resident of the borough of Brooklyn, county of Kings, and State of New York, have invented certain new and useful Improvements in Sheet Separating and Feeding Apparatus, of which the following is a specification.

This invention is directed to paper handling machinery and particularly to means for separating sheets and feeding them one at a time to an operative point. The invention is a division of my co-pending application No. 601,858 filed November 18, 1922.

In my prior application I have disclosed a method and apparatus for separting the uppermost sheet from a plurality of piles of pattern pieces and feeding the several sheets to an operative point where they are simultaneously engaged with a device which winds or folds them into a long narrow pack, and means for removing said pack from the winding mechanism and creasing the folds and subsequently winding the long pack in another direction so as to fold the same into a small compact package.

The present application is directed particularly to the class of sheet separating and feeding means disclosed in the former application and to means for transferring the sheets after they have been folded.

The invention is illustrated in the accompanying drawings in which Fig. 1 is a side elevation of a machine embodying my invention;

Fig. 2 is a sectional view on line 2—2 of Fig. 1;

Fig. 3 is a longitudinal section of the machine on a plane behind the frame shown in Fig. 1; as indicated by line 3—3 of Fig. 2;

Figs. 4 and 5 are details of mechanism for actuating the feeder.

Figs. 6, 7, 8, 9, 10, 11, 12 and 13 are further details of the feeder actuating mechanism, Figs. 11 and 12 being sections on the correspondingly numbered lines of Fig. 10; and Fig. 13 being a view illustrating a different position of a part shown in Fig. 11;

Fig. 14 is a vertical sectional view on line 14—14 of Fig. 2;

Fig. 15 is a fragmentary detail of parts shown in Fig. 14;

Fig. 16 is a detail section on line 16—16 of Fig. 14;

Fig. 17 is an enlarged detail showing a portion of the feeder carriage and a gripper carried thereby;

Fig. 18 is a front view of the parts shown in Fig. 17;

Fig. 19 is a section on line 19—19 of Fig. 17 with parts shown in full lines in a different position;

Fig. 20 is a detail of parts shown in Fig. 17, the positions corresponding to those shown in Fig. 19;

Fig. 21 is a horizontal section on line 21—21 of Fig. 17, the gripper finger however being shown open in this view;

Fig. 22 is a view similar to Fig. 21 showing the gripper finger in closed position corresponding to Fig. 17;

Figs. 23 and 24 are fragmentary views illustrating different positions taken by the gripper fingers as they pucker and grip the topmost one of a pile of superposed sheets.

*Sheet feeder.*—Referring first to Figs. 1 and 2 of the drawings, the machine includes out-board frames one of which is shown at 10 and an intermediate frame 14. To the frames 10 and 14 are secured four uprights 16, 18, 20 and 22. These uprights support inclined tracks 24 and 26, 28 and 30 which serve as guides for the carriage C. The carriage comprises side plates 32 and 34 which are provided at their lower ends with rollers 36 adapted to travel between the rails 24 and 26 and the rails 28 and 30. Extensions 38 and 40 are secured to the upper ends of the plates 32 and 34 and carry rollers 41 which also run between said rails. The plates 32 and 34 support a plurality of upper cross-shafts 42 and lower cross shafts 44. These shafts carry the grippers indicated as a whole by the letter B. The grippers each include an arm 46, Fig. 2, which is slidable vertically in a corresponding guide 48 supported on cross shafts 42 and 44 above referred to. There are a multiplicity of these grippers as shown in Figs. 1, 2 and 14 and they are of identical construction and a description of one will suffice for all.

At the lower end of the gripper arm 46 is secured a presser finger 50 provided with a resilient cap 52 of rubber or other suitable material. Each arm 46 is formed with a lower projection 54 and an upper projection 56 forming pivotal bearings for a vertical shaft 58 carrying at its lower end an arm 60 to which a picker finger 62 is pivoted by a pin 64 as clearly shown in Figs. 17 to 24. A spring 65 surrounds the lower end of each shaft 58 and tends to press the picker finger 62 toward the presser finger 50. The shaft 58 carries a fin 66 near its upper end which is normally engaged by the end 68 of a lever 70 loosely pivoted on the cross shaft 44. The lever 70 is provided with a perforated extension 72 through which passes a rod 74. The rod 74 for each row of grippers is supported at its ends in arms 76 and 78 which are pinned or otherwise secured to the shafts 44. The several arms 76 (Fig. 15) at one end of the carriage are connected to one another by a link 80 so that all of the arms 76 and 78 of the carriage will move in unison. One of the shafts 44, namely the one next to the lower end of the carriage as shown in Fig. 15, carries a lever 82 having a roller 83 on its end adapted to be lifted by a bar 84 which is actuated by mechanism hereinafter described. The guides 48 in which the gripper arms 46 are mounted, are adjustable laterally along the rods 42 and 44 and said guides are each adapted to be held in a desired position of adjustment by means of a clamp screw 86 mounted in a hub 49 formed on said guide 48. The guide 48 carries an angle plate 88 overlapping the lever 70 so that as the guide 48 is adjusted laterally on the rods 44 the lever 70 will be moved along with it, it being remembered that said lever is loosely mounted on the shaft 44 and is provided at its upper end with a perforation permitting it to slide freely along the cross rod 74.

The above described gripper mechanism is capable of lifting the topmost sheet from a pile of pattern pieces or sheets carried on the trays H of the magazine A. The several trays H of the magazine are carried by a frame 90, Fig. 1, which is periodically lifted by mechanism hereinafter described so as to bring the multiplicity of piles of pattern sheets into engagement with the grippers.

The frame 90 as shown in Fig. 16 carries one or more dowel pins 91 which enter suitable holes formed in the lowermost tray so as to position it correctly thereon. Likewise the trays are each provided with one or more dowel pins 93 which enter suitable holes in the adjacent tray so as to position each tray correctly with respect to its neighbor. Each of the trays H, with the exception of the lowermost one, carries a side cleat 95 arranged to hold the several trays in proper nested position as shown in Fig. 16. The frame 90 when in its lowered position, rests on a pair of fixed cross bars 97, 99, Fig. 14, so as to relieve the operating mechanism of the weight of the frame, the several trays H carried thereby and the sheets supported in said trays.

When the trays are lifted the gripper fingers are separated, as indicated in Fig. 21, and the lifting of the tray causes the picker finger 62 to rock on its pivot 64 against the action of a light spring 61, Figs. 18 to 24. Further lifting of the trays causes the topmost sheet of the pile to engage the presser finger 50 and lift the gripper arm 46 bodily a short distance as indicated between the different elevations of the tray H shown in Figs. 23 and 24. This action causes the finger 50 to exert considerable pressure due to the weight of arm 46 on the pile of sheets and prevents the topmost sheet from slipping when the picker finger 62 is rocked on the axis of the shaft 58. After the trays H have been lifted to their high position, the shaft 58 is rocked by the spring 65 due to the fact that the lever 70 has been moved from the full line position shown in Fig. 20 to the dotted line position, by the rod 74. The angular movement of the picker finger 62 causes it to pucker the sheet as shown at P in Figs. 22 and 24. The spring 65 exerts sufficient force to securely hold the sheet as the carriage C moves down its inclined track.

In the machine shown the carriage is provided with eight rows of shafts 42 and 44 and eight trays H for supporting piles of pattern sheets, each row of shafts carrying one or more grippers according to the width and number of sheets carried by the trays. Small pattern pieces or sheets like those of a pocket or collar, for example, will require only one gripper, while wider sheets such as a skirt front or side panel may require two or more grippers. The number of grippers carried by each row of shafts 42 and 44 will be governed according to the size of sheets and the number of piles in each tray.

The action of the fingers 50 and 62 in picking a sheet from a pile is analogous to the operation of picking a sheet by hand by first pressing the thumb on the top of the pile, to exert a slight pressure on the top sheet and drawing the forefinger toward the thumb to pucker the sheet to grasp it between the fingers.

The means for rocking the lever 82 which in turn rocks the shafts 44 carrying the arms 76 and 78 which support the several rods 74, includes the inclined bar 84 which bar is provided with cam slots 92 and 94. Pins 96 and 98 project through said slots, the pin 96 being secured to the upright 18 and the pin 98 being secured to the frame 10. When the carriage C is in its upper position as shown in Fig. 1, the rod 84 is also in its upper position with the pins 96 and 98 engaging the lower ends of the slots and holding the arm 82 in a position shown in Fig. 3 so as to hold the gripper fingers 50 and 62 in the open position illustrated in Fig. 21. The bar 84 is held in such raised position by means of an arm 100 carried on a shaft 102. This shaft carries a lever 103 connected with a link 104 to an arm 106 pivoted at 108 carrying a roller 110 arranged to co-act with a cam 112 mounted on a shaft 114. The cam 112 is so designed that when the carriage is in its upper position it holds the grippers open until the trays move up, whereupon the grippers are closed. The grippers remain closed for approximately a half revolution of the cam at which time the sheets have been carried to an operative position by the movement of the carriage C, whereupon the cam causes an opening movement of the grippers through the connections 103 to 110 which results in releasing the sheets from the grippers.

The shaft 114 also carries a worm gear 116 meshing with a worm 118 carried by the main drive shaft 120. This shaft is driven from a belt pulley 122 on a jack shaft 124 carrying a clutch 126 and a gear 128 which gear meshes with a gear carried on a shaft 120. The pulley 122 is driven by a belt connected to a motor or any other suitable source of power. When the clutch 126 is shifted to operative position to start the machine the shaft 120 rotates continuously to drive the various mechanisms herein set forth, but means are provided whereby certain supplemental drive mechanisms can intermittently drive various elements hereinafter more fully described.

At the left end of Fig. 1 is shown a worm gear 134 meshing with a worm wheel 136 on a shaft 138 journalled in the frames 10 and 14. This shaft carries a number of cams including the one shown in dotted lines at 140 in Fig. 14. This cam is adapted to co-act with a roller 142 carried by a yoke 144 having extensions which straddle the shaft 138, said yoke being connected with an arm 146 carried on a rock shaft 148. This rock shaft also carries bell cranks 150 having arms 152 and 154. Each arm 154 is connected by a link 156 with a bell crank 158 carried on a shaft 160. The bell cranks 150 and 158 are connected by vertical links 162 and 164 with the frame 90 which supports the several trays H of the magazine. Through these connections it will be seen that rotation of the shaft 138 will periodically lift the frame 90 so as to bring the topmost sheet in each pile into co-action with the fingers of the grippers above described. There are two links 162 and two links 164 located in alignment with each other so as to support the magazine at four points, and the motion transmitting mechanism is so proportioned that the trays move upwardly in a horizontal position, in other words a parallel motion is given to the magazine by the movement of the cam 140. The supporting frame 90 for the magazine carries front and rear rollers 166 and 168 which engage the uprights 18 and 16 respectively and similar rollers 170 and 172 which engage the uprights 22 and 20. These rollers serve to guide the magazine in its upward movement so that the piles of sheets carried by the trays H are moved vertically in a straight line to bring the sheets into proper position for engagement with the fingers of the grippers B.

As above stated the carriage C is provided with grippers adapted to pick the topmost sheet from the several trays simultaneously. After this has been done the carriage moves forward along the inclined tracks carrying the sheets with it to an operative station, the sheets overlapping one another as will be understood.

The carriage is caused to dwell at said operative station for a period of time long enough to permit a tucker blade 188 to move downward and insert the sheets carried forward by the gripper into engagement with a clamp carried by a sheet wrapping arbor D which as disclosed in my above identified co-pending application is arranged to be periodically rotated through a sufficient number of revolutions to wind the several sheets therearound so as to wrap them into an elongated pack.

The elongated pack is stripped or transferred from the arbor D by mechanism which moves the pack longitudinally into engagement with a pair of co-acting rollers which crease the folds and feed the pack into engagement with a second winding mechanism, as disclosed in my above application, wraps the elongated pack into a short compact package. The sheet winding arbor and latter mechanism is not shown and described in detail herein as it is fully disclosed and claimed in other co-pending applications, Nos. 601,858, filed November 18, 1922 and 734,386, filed August 27, 1924.

*Feeder moving mechanism.*—The carriage C must be periodically moved from the upper position shown in Fig. 1 along its inclined guide rails to a lower position in order to carry the sheets into juxtaposition to the arbor D. The carriage must dwell for a short time in this position to permit the tucker blade 188 to operate while the carriage and the arbor D are at rest. It is advantageous to lock both the carriage and the arbor against movement at different times. The means for intermittently moving the carriage and locking it will now be described with reference particularly to Figs. 3, 4, 5, 6 to 15.

Referring first to Figs. 3 and 6 a shaft 224 carries sprockets 226 near its ends adjacent the inclined tracks which guide the carriage in its movements. This shaft is journalled in suitable bearings in the frames 10 and 14. Chains 228 are constantly driven by the sprockets 226 and said chains pass around upper idler sprockets 230 mounted in suitable bearings secured to the guide rails 24, 26, 28 and 30. The shaft 224 which carries the sprockets 226 also carries on one end a sprocket 229 which is driven by a chain 225, Fig. 3 which passes over a sprocket 227 carried on a shaft 492 driven by bevel gears 494 and 496 from shaft 120.

Each chain 228 carries a driving lug 232 which is adapted to engage a respective dog 234 pivoted at 236 on the outer sides of the plates 32 and 34 respectively. The dogs are provided at their upper and lower ends respectively with extensions 238 and 240 which are alternately swung into the path of the lugs 232 carried by the respective chains 228. Impositive locks consisting of spring-pressed balls 242 and 244 are provided to lock the dogs in their different operative positions. Fixed cams 246 are secured to the intermediate portions of the rails 24 and 28 as shown in Figs. 8, 9 and 11. Similar cams 248 are secured near the lower ends of the rails 26 and 30. As hereinafter described these cams are arranged to move the dogs 234 into and out of position at the proper times so as to cause the carriage to move downwardly and carry the sheets to be folded to an operative station and permit the carriage to dwell for a short interval while the tucker blade, 188 above referred to, inserts the sheets into engagement with the clamp of the arbor D. The dogs are tripped out of engagement with the chain during this interval and the chain rotates freely without moving the carriage. After this interval the dogs are swung into position to be engaged by the lug 232 so that the chain will move the carriage back to the position shown in Fig. 1 where the grippers are in position to again engage the sheets when the magazine carrying the trays H is elevated. In this position the dogs 234 are again tripped out of engagement with the chain to permit the carriage to remain stationary although the chain is still moving.

This operation is illustrated in Figs. 3 to 9. The chain is constantly driven in the direction of the arrow m. Starting with the position of the carriage shown in Figs. 3 and 6, the upper end 238 of the dog has been moved by the inclined surface 247 of the cam 246 to throw the dog 234 out of the path of the chain lug 232 as shown clearly in Fig. 11. This action will throw the end 240 of said dog under the lower run of the chain in position to be struck by the chain lug 232 when it travels around the sprocket 230. The lower run of the chain, of course, travels in the opposite direction to the upper run as indicated by the arrow n in Fig. 7, and when the chain lug 232 comes into contact with the lower end of the dog it will engage the extension 240 and thereby move the carriage downward along its inclined guide rails. This downward motion will continue until such time that the said extension 240 of the dog engages the inclined surface 249 of the cam 248. Continued motion of the chain will cause the dog to be rocked on its pivot 236 to the position indicated in Fig. 13. In this position the opposite end of the dog is set to be engaged by the chain lug after it has traveled around the sprocket 226. From the time that the cam 248 disengages the dog until the time that the chain lug travels around to strike the extension 238, the carriage will dwell or remain stationary in its lower position thus allowing sufficient time to permit the tucker blade above referred to to insert the sheet into engagement with the clamp on the arbor D, and also permit said tucker blade to be withdrawn by the arm 198 as above described. After this action has taken place the carriage will travel upward in the direction of the arrow m until the cam 246 again trips the dog. This completes the cycle of the carriage movements and leaves it at rest for a short interval during which the frame 90 and trays H are again elevated and the above described cycle is then repeated.

To insure accuracy of the movements of the carriage and to prevent overrunning of the chain, a carriage locking device is provided, including hooks 250 mounted on a rock shaft 252 and adapted to engage stops 254 secured to the side plates 32 and 34 of the carriage. When the carriage reaches its lowermost position, as indicated in Fig. 4, the hook 250 falls into engagement with the stop 254 and a pawl 256 also carried on the shaft 252 drops in front of the dog 234. By these means it will be seen that it is impossible to move the carriage in either direction during the time the chain is rotating freely. When it is time to again move the carriage to its upper position, the chain dog 232 has traveled around to the position illustrated in Fig. 5 where it engages the pawl 256 and lifts it, thus rocking the shaft 252 and disengaging the hook 250 from the stop 254. This permits the chain to move the carriage in the direction of the arrow m back to the starting position. Connected to the upper end of the carriage is a pair of cables, one of which is illustrated in Fig. 14 and indicated by numeral 258, each cable being secured to a carriage bracket 260 and passing around a sheave 262 mounted in a suitable bearing secured to the upper ends of the carriage guide rails. Each cable 258 carries a counterweight 264 of sufficient mass to hold the carriage in the upper position against a suitable fixed stop. This counterweight also serves to assist the chain in moving the carriage upward as will be understood.

*Operation.*—All the pattern sheets required to form a number of complete patterns of the same size and style are placed in separate piles or stacks. For example, if patterns for a waist, say size 36 are to be folded, all the waist fronts are placed in one pile, the backs in another pile, sleeves in the third pile, collars in the fourth pile, cuffs in another pile, and so on. If the pattern is for a dress or the like, the skirt front, panels, pockets and so forth are arranged in respective piles.

Each pile therefore constitutes a multiplicity of sheets which are duplicates of one another. The size, that is, the length and width of the sheets in the several piles are quite different and the shapes of said sheets in the different piles are quite different. This lack of uniformity of size and shape of the sheets in the different piles presents problems not usually encountered in paper folding machines such as used in connection for example with newspaper presses, paper bag machinery and the like. The pattern sheets are generally made of thin flimsy paper such as tissue paper and the handling of this material presents problems in handling, not usually encountered in other folding machines.

The feeding device herein described provides means for solving the problem of picking the topmost sheets from each of the several piles. The wrapping arbor D provides means for wrapping sheets of different sizes in a single long narrow pack and the pack wrapping arbor not shown is provided for folding this pack into a short compact package.

The piles of sheets above referred to are placed in trays H. Some of the trays may contain only one pile of sheets when the pattern piece is a large one and other trays may contain two or more piles of sheets of smaller pattern pieces. After the several piles have been arranged in the several trays, said trays are stacked one upon the other as shown in Figs. 14 and 16. As best shown in Fig. 14, the forward edges of the trays are offset from one another so as to leave the top of the piles in each tray exposed at one end. Suitable locating pins, 93 are carried on the underside of each tray and adapted to correctly position each tray with respect to its neighbor. The lowermost tray rests on the frame 90 which is provided with suitable locating pins 91 adapted to position the tray on said frame. When the several trays constituting the magazine have been placed in position, the clutch 126 is shifted to operatively connect the main shaft 120 with the driving motor. Through the connections previously described the shafts 148 and 160 are rocked, which action lifts the frame 90 and trays carried thereby so as to cause the topmost sheet in each of the several piles to be engaged by the fingers of the grippers B, the fingers at this time being open. The arm 100 is now rocked to the right from the position shown in Fig. 3 thus permitting the bar 84 to slide downward on its pins 96 and 98. Due to the inclination of slots 92 and 94 the bar travels away from the carriage C; that is to say, its perpendicular distance from the carriage is increased. The roller 83 carried by arm 82 which is pivoted on one of the carriage cross shafts 44 follows the bar 84 and hence rocks said cross shaft. This rocking movement is communicated to all of the other cross shafts 44 through the arms 76 and connecting rod 80, said rocking movement permits all of the fingers 62 to close and grip the topmost sheet. Frame 90 carrying the trays H, is then lowered and the carriage moves downward under the influence of chains 228 and the driving lug 232 carried thereby. When the carriage reaches its lowermost position the driving dog for said carriage is tripped and the carriage dwells for a short interval in this position. The downward movement of the carriage brings the topmost sheet of each pile forward so that they lie over the top of the sheet-wrapping arbor D, and the tucker blade 188 is aligned with the open clamp 190 of said arbor. On the downward movement of the carriage, the cross bar 194, which is operatively connected with the tucker blade, entered the forked end 196 of the arm 198. This arm is now rocked by the cam 216 through arm 208, link 206 and arm 204, carried by shaft 200 to which the forked arm 198 is secured. This action inserts the multiplicity of pattern sheets into engagement with the clamp 190 of the arbor D.

The arbor is of course stationary during the time the sheets are inserted into engagement therewith and suitable locking means, forming no part of the present invention, (disclosed and claimed in my original application) comes into play to prevent movement of said arbor during the insertion of the sheets. After the tucker blade 188 is lifted the arbor lock is released and the carriage returns to its upper position, as illustrated in Fig. 1, which restores it to the starting point ready to repeat the feeding of another group of sheets when the trays H are again lifted to bring the various piles of pattern pieces carried thereby into operative engagement with the fingers of the sheet grippers.

While I have described with great particularity the specific embodiment of the invention herein disclosed, and have referred to the feeding and sheet separating mechanism for use in combination with certain wrapping mechanism, it is not to be construed that I am limited thereto as the apparatus may be used in various combinations and modifications and rearrangement of parts may be made without departing from the spirit and scope of the invention as defined in the appended claims.

What I claim is:

1. A sheet feeder including a carriage which supports a multiplicity of mechanically actuated sheet grippers, each including a member adapted when moved to separate one sheet from the top of a pile, means for simultaneously engaging a multiplicity of piles of sheets with said grippers and means for intermittently moving said carriage.

2. A sheet feeder including a carriage which supports a multiplicity of mechanically actuated sheet grippers, a plurality of trays each adapted to support one or more piles of sheets, means for causing a relative movement between the carriage and said trays to move the grippers against the flat surface of the topmost sheet or sheets in each tray, means for actuating said grippers so that they will pick the topmost sheet from each of said piles, and means for moving said carriage to carry said sheets to an operative station.

3. A sheet feeder including a multiplicity of grippers mounted on a movable carriage in separate rows, a plurality of trays each adapted to support one or more piles of sheets in position to be engaged from above by the grippers in one of said rows, and means for elevating said trays to engage the flat surface of topmost sheet in each pile with the corresponding gripper or grippers, and means for intermittently moving said carriage.

4. A gripper for picking a flimsy sheet from a pile comprising a member arranged to press against the flat surface of a sheet, and a picker finger supported by and arranged to be moved toward said member to pucker and grip said sheet between them, and means for moving said member and said finger bodily to transfer the sheet from one point to another.

5. A gripper for picking a single sheet from the top of a pile comprising a slidably mounted arm having a presser finger adapted to engage the top of the pile and a pivoted finger movable toward said presser finger and adapted to pucker the topmost sheet in said pile and hold the puckered portion between said fingers.

6. A sheet feeder including an intermittently movable carriage having mounted thereon a plurality of rows of grippers adapted to engage the flat surface of sheets, a plurality of trays each adapted to support one or more piles of sheets of varying size and shapes and means for adjusting said grippers laterally on said carriage to position them for coaction with selected piles.

7. A sheet feeder including an intermittently movable carriage having a plurality of rows of grippers mounted on said carriage, a plurality of trays each adapted to support one or more piles of sheets of varying sizes and shapes, and means for adjusting said grippers laterally to align with desired piles and means for causing a closing movement of the grippers when the carriage is in one position and an opening movement when the carriage is in another position.

8. A sheet feeder including a movable carriage having a plurality of supporting shafts, guides carried by said shafts, gripper arms movable in said guides, presser fingers secured to said arms, means tending to move said picker fingers toward said presser fingers and means for moving said picker fingers away from the presser fingers to release the sheets held between the fingers.

9. A sheet feeder including a movable carriage having a plurality of gripper supports, guides carried by said supports, means for securing said guides in different positions of adjustment on said supports, gripper arms movable in said guides and carrying fingers adapted to pucker a tissue paper sheet, in combination with trays for supporting said sheets and means for lifting said trays to bring the sheet into position to be engaged by said fingers.

10. In a sheet feeding mechanism gripper guides, gripper arms slidable vertically in said guides, a presser finger secured rigidly thereto and a picker finger movable relatively thereto, means tending to press the picker finger toward the presser finger and means for moving the picker finger away from the presser finger.

11. In a sheet feeding mechanism gripper guides, gripper arms slidable vertically in said guides, a presser finger secured rigidly thereto and a picker finger movable relatively thereto, means tending to press the picker finger toward the presser finger and means for moving the picker finger away from the presser finger, a tray adapted to support a pile of sheets and means for lifting said tray to engage the topmost sheet with said gripper fingers.

12. In a sheet feeding mechanism, a tray adapted to support a pile of sheets, a gripper arm, means for bodily moving said gripper arm relatively to said tray, and means for guiding said gripper arm for vertical movement, fingers carried by said arm, means for lifting said tray so that the pile of sheets moves the gripper arm vertically in its guide and means for moving one of said fingers toward the other to pucker and grip the topmost sheet in said pile.

13. In a sheet feeding mechanism, a plurality of superposed horizontal trays each adapted to support one or more piles of sheets, the forward edges of each tray being offset with respect to the forward edge of the next underlying tray to expose the top of each pile of sheets, a carriage movable in an inclined plane and carrying a plurality of rows of grippers, the grippers in each row being arranged to pick a sheet or sheets from the pile or piles in one of said trays.

14. In a sheet feeding mechanism, a carriage supporting a plurality of grippers each having a presser finger and a picker finger, trays each supporting a pile or piles of sheets, means for lifting and lowering said trays, means for moving the picker fingers to grip the sheets when the trays are lifted, means for moving the carriage when the trays are lowered and means for moving said picker fingers to release the sheets after the carriage has moved forward.

15. In a folding machine, a sheet feeder including a plurality of trays each of which supports the sheets to be folded, a plurality of grippers, means engaging only the top surfaces of the sheets with the grippers and means for simultaneously moving said grippers to transfer the sheets to a predetermined position.

16. In a folding machine a plurality of superposed trays each adapted to hold a plurality of sheets and mechanically actuated grippers for simultaneously lifting at least one sheet from each tray and simultaneously feeding the superposed sheets to a predetermined station.

17. A folding machine including a plurality of trays each adapted to support one or more piles of pattern sheets, and means for simultaneously gripping one sheet in each pile at a point intermediate its ends and moving it to an operative station.

18. A folding machine including a magazine for holding a multiplicity of pattern sheets, comprising a plurality of superposed trays each adapted to support one or more piles of pattern sheets, a carriage movable in juxtaposition to said magazine and means carried by said carriage for gripping one sheet in each pile at a point intermediate its ends, means for moving said carriage to an operative station and means for releasing said sheets from said gripping means when the carriage reaches said station.

19. In a sheet feeding mechanism of the character described, a plurality of trays each adapted to support one or more piles of sheets, a carriage movable in juxtaposition to said trays, sheet grippers carried by said carriage, a constantly moving member and means for periodically engaging the carriage with and disengaging it from said member.

20. In a sheet feeding mechanism of the character described, a plurality of trays each adapted to hold a plurality of sheets, a carriage having grippers for picking the topmost sheet from each tray, means for periodically lifting the trays to engage the sheets with the grippers and means for periodically moving the carriage.

21. In a sheet feeding mechanism of the character described, a plurality of trays each adapted to hold a plurality of sheets, a carriage having grippers for picking the topmost sheet from each tray, means for periodically lifting the trays to engage the sheets with the grippers, means for intermittently moving the carriage, and means for securely locking the latter when it is at rest.

In witness whereof, I have hereunto signed my name.

SIMON COOPER.